United States Patent [19]

Hobson

[11] Patent Number: 5,378,371
[45] Date of Patent: Jan. 3, 1995

[54] METHOD OF REMOVING OIL FROM WATER AND APPARATUS THEREFOR

[75] Inventor: Mark T. Hobson, Chagrin Falls, Ohio

[73] Assignee: Abanaki Corporation, Auburn, Ohio

[21] Appl. No.: 8,511

[22] Filed: Jan. 25, 1993

[51] Int. Cl.$^6$ .............................................. C02F 1/40
[52] U.S. Cl. ................... 210/691; 210/783; 210/242.4; 210/400; 210/DIG. 3
[58] Field of Search ............. 210/400, DIG. 3, 242.3, 210/783, 776, 691, 242.4; 198/643, 805, 835, 842, 834; 474/100, 142, 185, 150, 152, 153, 144, 162

[56] References Cited

U.S. PATENT DOCUMENTS

| | | | |
|---|---|---|---|
| 2,095,203 | 10/1937 | Peets | 474/144 |
| 2,391,642 | 12/1945 | Reed | 198/523 |
| 2,693,759 | 11/1954 | Abellanet | 198/643 |
| 3,055,229 | 9/1962 | Mecham | 198/835 |
| 3,344,062 | 9/1967 | Kosnar | 210/693 |
| 3,363,476 | 1/1968 | Brown | 474/185 |
| 3,375,725 | 4/1968 | Mathison | 474/153 |
| 3,430,506 | 3/1969 | Stone | 198/835 |
| 3,995,487 | 12/1976 | Locke | 198/835 |
| 4,067,438 | 1/1978 | Spurr et al. | 198/805 |
| 4,303,523 | 12/1981 | Ruppnig | 210/386 |
| 4,962,847 | 10/1990 | Pisors et al. | 198/643 |
| 5,015,378 | 5/1991 | Lewan et al. | 210/400 |
| 5,223,128 | 6/1993 | Combrowski | 210/138 |

OTHER PUBLICATIONS

Abanaki Corporation Literature "Tote-It Portable Oil Skimmer Gives Total Convenience for All-Round Use", date unknown.
Abanaki Corporation Drawing No. 8300, Sep. 16, 1988.
Abanaki Corporation Literature "Oil Skimmers", ©1989-011589A-3.
Abanaki Drawing No. 8300, dated Sep. 21, 1986.

Primary Examiner—Matthew O. Savage
Attorney, Agent, or Firm—Watts, Hoffmann, Fisher & Heinke

[57] ABSTRACT

An oil skimmer of the endless belt type is disclosed. The unit has an adjustment for adjusting the location of the axis of head pulley rotation and a floating tail pulley to assure accurate tracking of the belts on the pulleys. The tail pulley features L-shaped spokes having legs that provide limited pulley-to-belt contact, minimizing oil transfer from the belt to the tail pulley, and also providing a mechanism for forcing oil against a descending belt reach to provide enhanced oil pick-up. The tail pulley is provided with a catch frame and an anchored tether for catching the belt and the tail pulley in the event that the belt breaks.

18 Claims, 4 Drawing Sheets

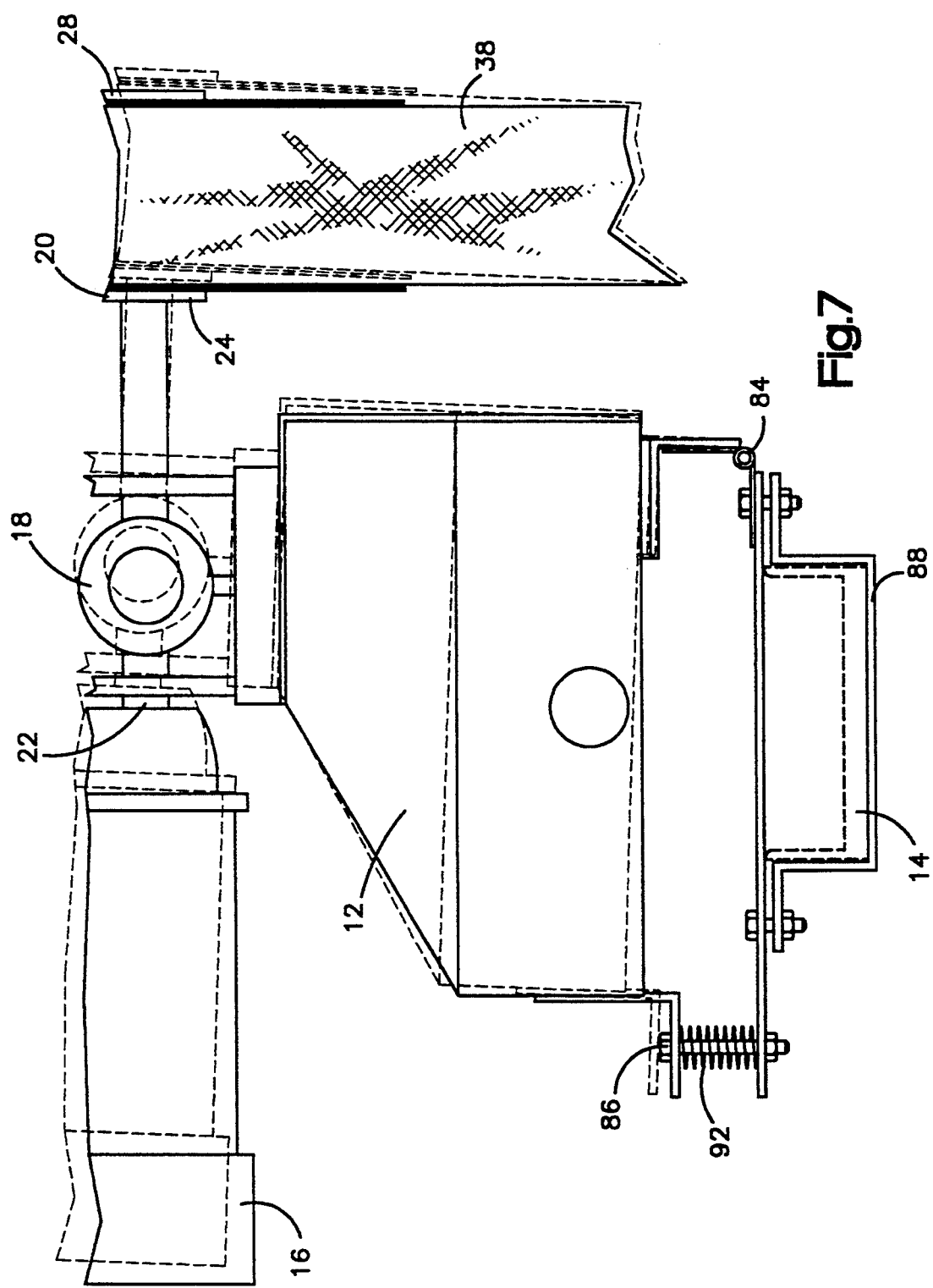

METHOD OF REMOVING OIL FROM WATER AND APPARATUS THEREFOR

CROSS REFERENCE TO RELATED APPLICATIONS

This application is related to U.S. Patent Application Ser. No. 07/950,802 filed on Sep. 24, 1992 titled Oil Skimmer and Method of Operation.

BACKGROUND OF THE INVENTION

1. Field of the Invention

The present invention relates to an apparatus for separating oil from water. and more particularly, to an oil skimmer assembly which has an endless belt for removing oil from the surface of water.

2. Description of Related Art

With oil skimmers utilizing endless belts, typically, the belt :is suspended from a driven head pulley. The belt is also passed around a tail pulley that is positioned in a body of water. When the head pulley is rotatably driven, a descending reach of the belt on entering the body of water will pick up surface oil and carry that oil around the tail pulley to an ascending reach of the belt. Wipers are positioned below of the head pulley near the top of the descending reach to scrape oil from the surface of the belt. Collection pans positioned below the wipers receive the separated oil and deliver the separated oil to a collection vessel for recycling or appropriate disposal.

In the past, the tail pulleys have usually either been mounted in a vessel containing the oil and water to be separated or alternately, supported exclusively by the belt. As an example of the latter, if oil is to be removed from a contaminated water well, an elongated belt supporting a tail pulley is dropped into the well, and the weight of the pulley and the belt provide belt tension. Clearly, if the belt breaks, there is a problem because the pulley will be dropped into the well and either lost or, at best, retrievable only through a successful "fishing" operation. Even if the belt does not break, on occasion, a pulley will slip out of the belt as the belt is lowered or during operation, and once again, an operator has, at best, a difficult retrieval process to confront.

Even where tail pulleys are not rotatably mounted in tanks but are supported by the belt, other problems manifest themselves. If the axis of rotation of the head pulley is not properly oriented, the belt will not track properly and excessive wear can occur. If the belt is steel, the wear is exacerbated and considerable damage can be caused to both the belt and the head pulley. Further, if the head pulley is equipped with magnets to drive the belt, a misaligned magnet or protruding magnet can cause excessive belt tension that results in belt failure.

Another problem is that when endless belt oil skimmers are used in quiescent bodies of water, their efficiencies can be relatively poor. The relatively poor efficiency is due to the fact that the belt picks up oil as it enters a water body and if the body is quiescent, the surface in the vicinity of belt entry soon becomes relatively oil free. Further, pick-up must wait for a relatively slow from portions of the body surface remote from the belt entry migration of oil location.

SUMMARY OF THE INVENTION

An oil skimmer made in accordance with the present invention overcomes the above shortcomings and provides the operator with ease of retrieval in the event of belt breakage, belt tracking adjustment and efficient oil pick-up capability. Basically, the oil skimmer has a frame including a motor support section near the top of the frame when the skimmer is in use. A motor is carried by the support and includes an output shaft. A head pulley is drivingly connected to the shaft. An endless belt is drivingly supported in engagement with the head . A tail pulley is floatingly supported by the belt and adapted to be immersed in a liquid volume when the skimmer is in use. The tail pulley has a shaft and a frame connected to the shaft. The frame has a has a support member adapted to catch the belt in the event that the belt breaks. The frame member has member for connecting to a tether.

BRIEF DESCRIPTION OF THE DRAWINGS

Preferred embodiments of the invention are shown in the accompanying drawings in which:

FIG. 7 is a fragmentary side elevation view of a top portion of the oil skimmer.

DESCRIPTION OF THE PREFERRED EMBODIMENTS

Figure 1:
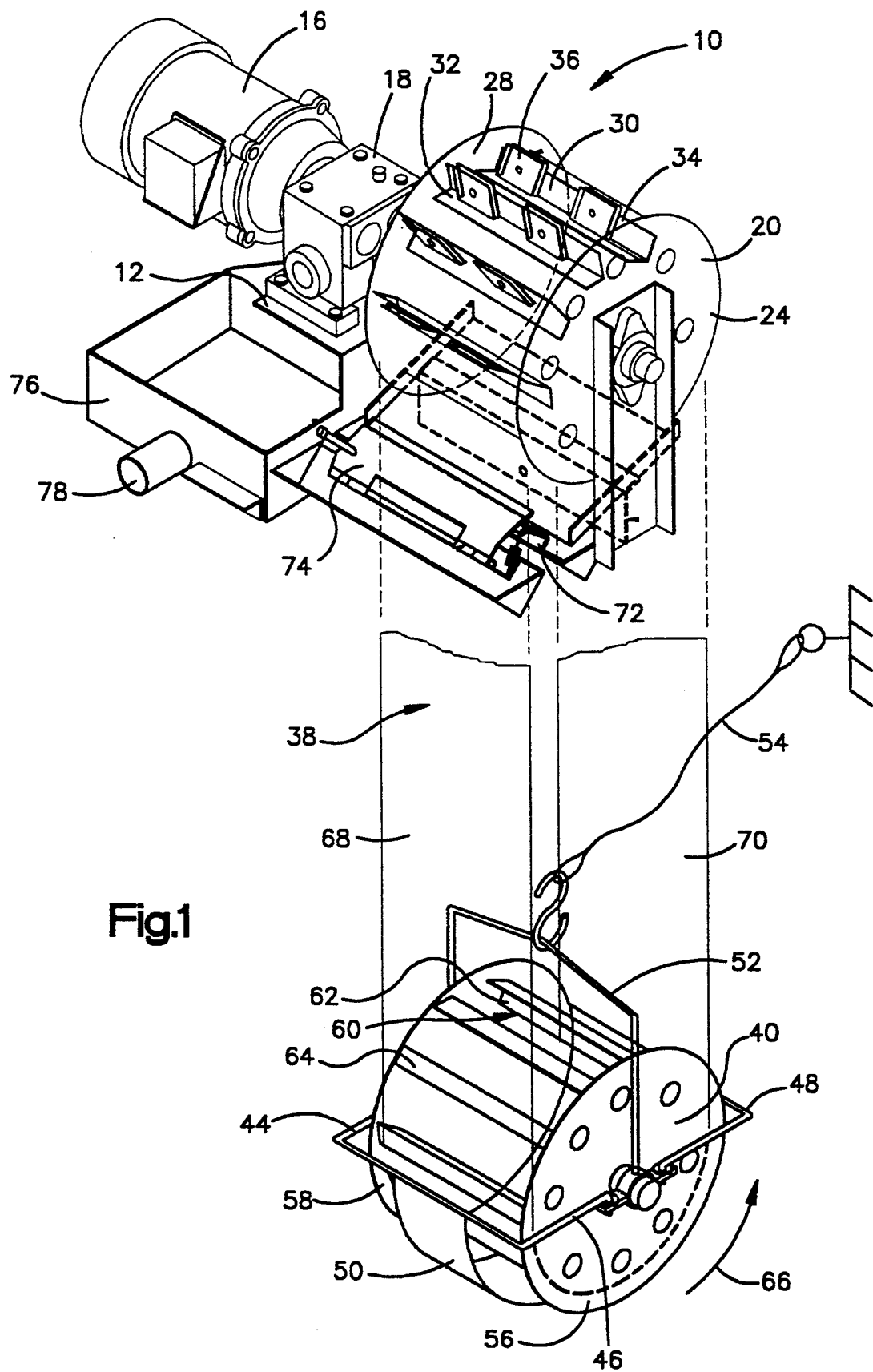
FIG. 1 is a perspective view showing the improved oil skimmer of the present invention.
Figure 2:
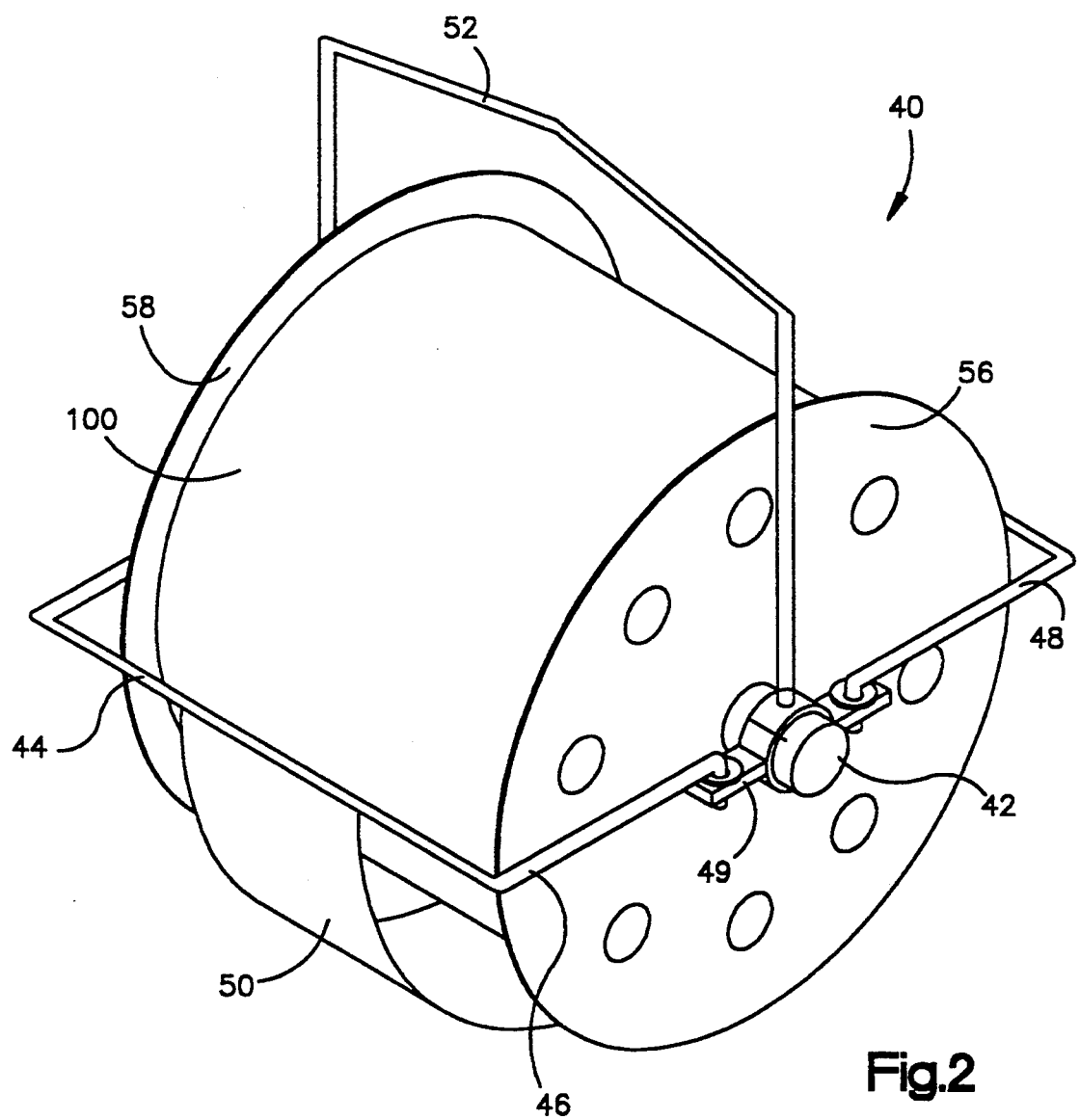
FIG. 2 is a perspective view of the tail pulley of the oil skimmer of FIG. 1.

Referring to FIG. 1, an oil skimmer embodying the present invention is shown generally at 10. The oil skimmer 10 is mounted above a body of fluid (not shown) and operated to remove surface oil from the fluid.

The oil skimmer 10 includes a frame 12 which is mounted on a stationary support 14. A motor 16 is connected to a reduction gear box 18. The gear box is secured to a support section located near a top of the frame 12.

A head pulley 20 is mounted on the output shaft 22 of the gear box 18 The head pulley 20 includes inner and outer side flanges 24, 28 which are in the preferred embodiment, connected together in spaced relationship by a set of spaced L-shaped spokes 30. As is best seen in FIG. 1, each of the head pulley spokes is L-shaped in cross section with arms 32 being disposed radially and legs 34 projecting orthogonally from the arms 32 at the inner ends of the arms.

A set of magnets 36 is provided. Each magnet is mounted in axially spaced relationship on one of the spoke arms 32 with the spoke legs 34 serving to support the magnets. The magnets 36 have outer surfaces disposed in an imaginary cylinder which is coaxial with the shaft 22 in order that the magnets drivingly engage an endless belt 38 which, in the disclosed embodiment, is steel.

As seen in FIG. 7, the motor 16 and head pulley 20 and frame element 12 are mounted on a hinge 84 for adjusting the angle of the head pulley shaft 22. A pair of adjusting bolts 86 join the frame element 12 to the frame including a support section in the form of a stationary support and clamp structure 88. Springs 92 are placed around the bolts 86 to urge the frame upwardly against the heads of the bolts 86. Tightening or loosening of the bolts 86 tilts the frame and motor and shaft 22 with respect to the stationary clamping structure 88. This permits adjustment of the belt tracking on the head pulley 20.

A tail pulley 40 is provided and is positioned at least partially in the body of fluid when the device is in use. The tail pulley 40 includes a shaft 42. A belt-retainer frame 44 is connected to the shaft 42. The frame 44 includes two squared U-shaped belt retainer members 46, 48 which project oppositely from a shaft mounted support bracket 49 to surround the tail pulley 40 and the belt 38. The belt retainer members 46, 48 extend radially from locations near the ends of the shaft 42 and lie in a plane which includes the axis of the tail pulley 40. The shaft 42 is rotatably connected to the brackets 49 such that the tail pulley 40 may rotate with respect to the frame 44.

Figure 5:
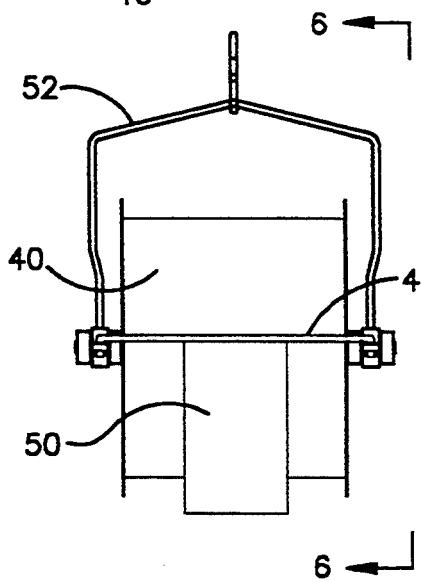
FIG. 5 is a front elevation view as seen approximately from the plane indicated by the lines 5—5 in FIG. 4.
Figure 6:
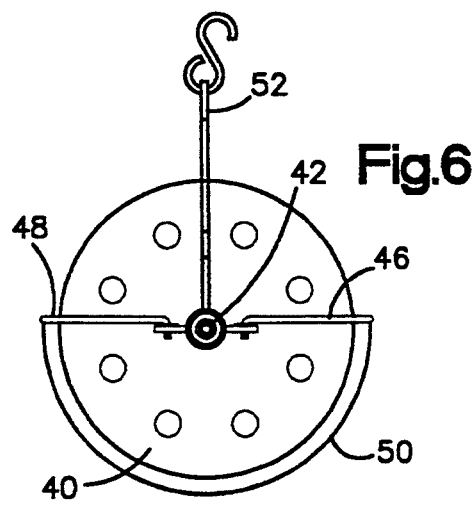
FIG. 6 is a side elevation view as seen approximately from the plane indicated by the lines 6—6 of FIG. 5.

A semi-circular, preferably fabric, catch pad 50 is connected at each end to one of the U-shaped member 46, 48 and generally coaxially surrounds the lower half of the tail pulley 44. As seen in FIG. 5, the catch member has a transverse width dimension W extending in a direction parallel to the axis of rotation of the tail pulley that is less than the axial width of the tail pulley. The catch pad 50 and the belt retainer members 46, 48 serve to catch and retain the steel belt 38 in the event that it breaks and falls from the head pulley 20. A connecting member 52 is also joined to the frame 44 and extends upwardly at approximately 90° from the rectangular members 46,48. The connecting member 52 is adapted to be attached to one end of a flexible tether 54 which is preferably anchored at its other end to a stationary member outside of the fluid. The tether is preferably a chain which serves to support the retainer frame 44 and the tail pulley 40 when they are lowered onto or removed from a body of fluid and also in the event of a belt breakage.

The preferred tail pulley 40 is shown in FIG. 1. The preferred tail pulley, like the head pulley, has spaced inner and outer annular flanges 56, 58. The inner and outer flanges 56, 58 are interconnected by a drum 100, or more preferably, a circumferentially spaced set of L-shaped spokes 60. Arms 62 of the spokes 60, like the arms 32 of the head pulley spokes 30, are radially disposed. In contrast to the head pulley 20, legs 64 of the tail pulley spokes 60 project orthogonally from the arms 62 at the radially outward ends of the arms. The legs 64 project from the arms 62 in the direction of pulley rotation as indicated by arrow 66, FIG. 1. The arms 62 have outer surfaces disposed in an imaginary cylinder that is coaxial with the shaft 42 and are sequentially in driven engagement with the belt 38. The tail pulleys illustrated in FIGS. 2–6 for simplicity of illustration are shown as having conventional cylindrical drums between the flanges rather than spokes.

Figure 3:
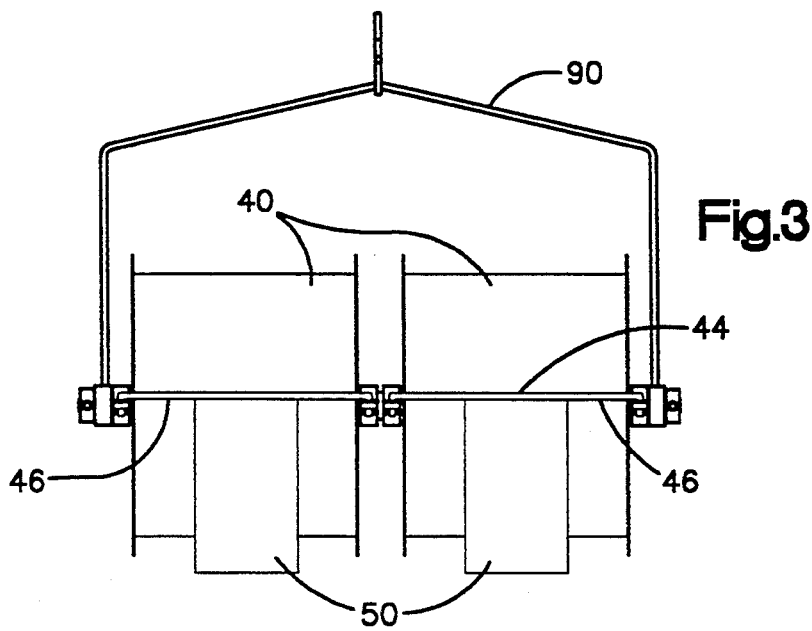
FIG. 3 is a front elevation view of an alternate embodiment of the tail pulley of FIG. 2.
Figure 4:
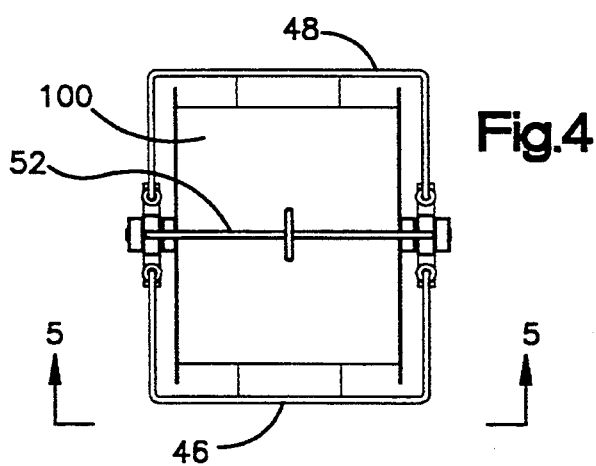
FIG. 4 is a top plan view of the tail pulley of FIG. 2.

In a second embodiment illustrated in FIG. 3, a pair of tail pulley 40 are joined together in a side-by-side axially aligned configuration and may share a common shaft. Each pulley has retainer members 46, 48 and catch members 50 as in the single-pulley embodiment. A single connecting member 90 is connected to the retaining flames and serves the same purpose as the connecting member 52 previously described.

OPERATION

In use, the oil skimmer 10 is mounted above the body of fluid from which oil is to be removed. The tail pulley 44 and the lower portion of the belt 38 are then lowered until they are submersed in the fluid. As the pulley and belt are lowered by using the tether 54, the retainer frame 44 functions to prevent the tail pulley from slipping out of the belt and dropping into the body of fluid.

Once the belt and tail pulleys are properly positioned in the fluid, the motor 16 is energized to cause the head pulley 20 to rotate. Through the engagement of magnets 36, the steel belt 38 is driven such that a descending 68 descends into the body of liquid. As the descending reach 68 enters the fluid, assuming there is oil on the surface of the fluid, the oil will adhere to both inner and outer faces of the belt 38. The belt then passes around the tail pulley 40. Due to the use of the spokes 60 rather than a cylindrical surface, transfer of oil from the inner surface of the belt 38 to the tail pulley is minimized.

An ascending reach 70 of the belt 38 carries the oil upwardly to and over the head pulley 20. At a location near the top of the descending reach 68, inner and outer wipers 72, 74, of conventional construction, engage the descending reach 68 and wipe the oil from it. The wiped oil is caught by a collection vessel 76 and thence discharged through a discharge port 78 for suitable recycling or disposal.

As the operation continues, appropriate tension is maintained on the belt 38 through the weight of the belt itself and the tail pulley 40 and frame 44. Thus, the tail pulley 40 is free to float and is supported by the belt.

Should there be a problem with the belt 38 tracking off center with respect to the head pulley 20, adjustment is accomplished by loosening or tightening the adjustment bolts 86 until the belt 38 is tracking properly between, and without engaging, the inner and outer flanges 24, 28.

The tail pulley spokes 60 provide one of the outstanding features of the invention. That is, that the L-shaped spokes 60 tend to agitate the fluid. Ideally, the tail pulley 40 is only partially submerged so that the spokes 60 will break the surface as they approach the maximum height. Since the spokes 60 are L-shaped with their legs 64 projecting orthogonally in the direction of rotation, the spokes 60 tend to trap surface oil and push the surface oil toward the descending reach 68 to enhance the oil pick-up efficiency of the belt 38.

Upon completion of an oil removal operation, or in the event of belt breakage, the tail pulley, the belt and the belt retainer are retrieved from the body of fluid by lifting them with the tether.

While a preferred embodiment of this invention has been described in detail, it will be apparent that certain modifications or alterations can be made without departing from the spirit and scope of the invention set forth in the appended claims.

I claim:

1. An oil skimmer comprising:
   a) a support frame including a motor support section near the top of the support frame when the skimmer is in use;
   b) a motor carried by the support section and including an output shaft;
   c) a head pulley drivingly connected to the output shaft;
   d) an endless belt in drivingly supported engagement with the head pulley;

e) a tail pulley supported by the belt and adapted to be immersed in a liquid volume for rotation about an axis when the skimmer is in use, said tail pulley having a tail pulley shaft, the tail pulley having an axial length;

f) a tail pulley frame connected to said tail pulley shaft;

g) a catch member supported at opposed ends thereof by the tail pulley frame and extending generally coaxially about half the circumference of the tail pulley and under the tail pulley and belt when in use with the belt being between the tail pulley and the catch member such that the catch member will catch the belt in the event that the belt breaks, the catch member having a transverse width dimension that extends in a direction parallel to the axis of said tail pulley, wherein said transverse width dimension is less than the axial length of said tail pulley and, h) said tail pulley frame having connecting means for connecting to a tether.

2. The skimmer of claim 1 wherein the belt is metal.

3. The skimmer of claim 2 wherein the metal is paramagnetic.

4. The skimmer of claim 1 wherein the motor shaft is generally horizontal when in use and the motor is adjustably mounted via an adjustment means interposed between the the support frame and a stationary support for moving the motor relative to the stationary support to adjust the shaft relative to the horizontal until the belt appropriately tracks the head pulley when in use.

5. The skimmer of claim 1 wherein the tail pulley includes a plurality of spokes extending from one side of the pulley to the other, at least a majority of which are of L-shaped cross section wherein the arm of each L is spaced from the tail pulley shaft and disposed generally radially of the tail pulley shaft and the legs of each L projects from the arm in the intended direction of pulley rotation when in use.

6. The oil skimmer of claim 1 wherein the frame surrounds the tail pulley and the catch member is a semi-circular member having spaced end portions connected to the frame.

7. An oil skimmer comprising:

a) a frame including a support section near the top of the frame when the skimmer is in use;

b) a gear motor, a pivotal connection between the motor and a stationary supports the motor including an output shaft;

c) the frame also including a mounting section for mounting the skimmer over a vessel containing a body of liquid;

d) a tail pulley shaft having a body, the output shaft and the tail pulley shaft body being spaced and generally parallel;

e) head and tail pulleys respectively mounted on the output and tail pulley shafts, the head pulley including magnets, the tail pulley having an axial length f) an endless belt disposed around the pulleys in magnet-produced driven relationship with the head pulley and in rotation-producing and pulley supporting engagement with the tail pulley;

g) the tail pulley including a frame connected to said tail pulley shaft, said frame having a catch member extending generally coaxially about half the circumference of the tail pulley and under the tail pulley and belt when in use with the belt being between the tail pulley and the catch member such that the catch member will catch the belt in the event that it breaks and falls from said head pulley, said frame being adapted to connect to a tether, the catch member having a transverse width dimension extending in a direction parallel to the shaft of said tail pulley that is less than the axial length of said tail pulley and, h) an adjustment means interposed between the motor and the stationary support for shifting the motor about the pivotal connection and thereby adjusting the tracking of the belt on the head pulley.

8. The skimmer of claim 7 wherein a clamping means is connected to the stationary support for securing the skimmer in place.

9. The skimmer of claim 7 wherein the belt is steel.

10. For use in an oil skimmer of the type having an endless belt driven by a head pulley above a body of water with oil on its surface and projecting when in use into the body, an improved tail pulley arrangement comprising:

a) a tail pulley having a shaft about which it rotates the tail pulley having an axial length b) a frame connected to said shaft, said frame having a catch member connected thereto, said catch member extending generally coaxially about half the circumference of the tail pulley and beneath said tail pulley when in use for catching said belt in the event said belt breaks and falls from said head pulley, the catch member having a transverse width dimension extending in a direction parallel to the shaft of said tail pulley that is less than the axial length of said tail pulley;

d) a connecting means on said frame adapted to connect to a tether for facilitating retrieval of said frame, belt, and pulley if such breakage occurs.

11. An improved tail pulley arrangement according to claim 10 wherein said frame includes a plurality of retaining members extending radially from locations near ends of said shaft and wherein said catch member is a semi-circular pad connected to said retaining members such that said pad is spaced from and beneath said pulley for catching broken belts when in use.

12. An arrangement of claim 11 wherein a tether is connected to the pulley via said connecting means.

13. The arrangement of claim 12 wherein the tether is a chain.

14. The arrangement of claim 13 wherein the catch member is fabric.

15. A tail pulley assembly for use in an oil skimmer of the endless belt type comprising:

a) a pair of spaced flanges interconnected by a belt-engaging structure disposed therebetween, the pulley also including an axially disposed shaft projecting through the flanges and including spaced end portions respectively projecting outwardly from the flanges;

b) a pair of support brackets respectively rotatably supporting the shaft end portions and otherwise disposed on opposite sides of the pulley exteriorly of the flanges, the brackets each including a pair of oppositely disposed, radially projecting ears;

c) a pair of generally U-shaped retainer members with one of the retainer members connected to a first of the bracket ears of each of the brackets and the other retainer member connected to the other bracket ear of each of the brackets such that the retainer members and the brackets together form a retainer frame surrounding the tail pulley;

d) a connecting member supportingly connected to each of the brackets and adapted for connection to a tether when in use whereby to maintain the tail pulley and the retainer frame in suspended relation beneath the connecting member when in use; and e) a catch pad secured to each of the retainer members and extending from one retainer member to the other beneath the tail pulley when the assembly is in use whereby to provide a tail pulley assembly which is prevented by the retainer frame from slipping off a belt as it is lowered into, removed from, or operated in a body of fluid, and whereby to the catch pad and retainer frame together will retain a belt at least partially within the pulley assembly even when the belt is broken to facilitate removal of a broken belt from such body of fluid.

16. A method of removing oil from a body of fluid comprising:

a) utilizing a flexible tether to lower a tail pulley assembly into the body of water until it its supported by an endless belt passed around a supporting and driving head pulley, the tail pulley having an axis of rotation and an axial length b) rotating the head pulley to cause the belt to collect oil from the surface of the body of water;

c) wiping oil from the belt at a location near the head pulley whereby to clean the belt for further oil pick-up and removal as the head pulley is rotated to move the belt;

d) upon completion of removal of a desired quantity of oil or upon breakage of the belt, removing the tail pulley assembly and belt from the body of fluid by lifting them with the tether; and e) maintaining the pulley assembly and the belt in a desired spacial relationship during such lowering and removing steps and oil-removing steps by surrounding the belt with a retainer frame, forming a portion of the tail pulley assembly and, during such lowering and removing steps, supporting the belt with a catch pad supported by the retainer frame and extending generally coaxially about half the circumference of the tail pulled and under the tail pulley when the tail pulley is in use, the catch pad having a transverse width dimension extending in a direction parallel to the shaft of said tail pulley that is less than the axial length of said tail pulley.

17. An oil skimmer comprising:

a) a support frame including a support section near the top of the support frame when the skimmer is in use;

b) a motor carried by the support section and including an output shaft;

c) a head pulley drivingly connected to the output shaft;

d) an endless belt in drivingly supported engagement with the head pulley;

e) a tail pulley supported by the belt and adapted to be immersed in a liquid volume when the skimmer is in use, said tail pulley having a tail pulley shaft;

f) a tail pulley frame connected to said tail pulley shaft;

g) a catch member supported by the tail pulley frame and extending under the tail pulley and belt when in use with the belt being between the tail pulley and the catch member such that the catch member will catch the belt in the event that the belt breaks;

h) said tail pulley frame having connecting means for connecting to a tether; and, i) the tail pulley, the tail pulley frame and the catch member being parts of a tail pulley assembly including:

ii) said tail pulley shaft projecting through the tail pulley and including spaced end portions respectively projecting outwardly from the pulley, ii) the tail pulley frame including a pair of support brackets respectively rotatably supporting the shaft end portions when the skimmer is in use, the support brackets being disposed on opposite sides of the tail pulley, the brackets each including a pair of oppositely disposed, radially projecting ears, iii) the tail pulley frame also including a pair of generally U-shaped retainer members with one of the retainer members being connected to a first of the bracket ears of each of the brackets and the other retainer member being connected to the other bracket ear of each of the brackets such that the retainer members and the brackets together form a retainer frame surrounding the tail pulley, iv) the tail pulley frame further including a connecting member supportingly connected to each of the brackets and adapted for connection to a tether when in use whereby to maintain the tail pulley and the tail pulley frame in suspended relation beneath the connecting member when in use, and v) the catch member being a catch pad secured to each of the retainer members and extending from one retainer member to the other beneath the tail pulley when the assembly is in use whereby to provide a tail pulley assembly which is prevented by the retainer frame from slipping off a belt as it is lowered into, removed from, or operated in such liquid volume, and whereby the catch pad and retainer frame together will retain a belt at least partially within the pulley assembly even when the belt is broken to facilitate removal of a broken belt from such liquid volume.

18. The skimmer of claim 17 wherein the catch member is fabric.

* * * * *